(12) United States Patent
Wright, Jr. et al.

(10) Patent No.: US 6,908,585 B2
(45) Date of Patent: Jun. 21, 2005

(54) PIGMENTED RADIATION CURED WEAR LAYER

(75) Inventors: Ralph W. Wright, Jr., Lancaster, PA (US); Gary A. Sigel, Millersville, PA (US); Jennifer W. Sager, Salunga, PA (US); William J. Kauffman, Manheim, PA (US)

(73) Assignee: AWI Licensing Company, Wilmington, DE (US)

( * ) Notice: Subject to any disclaimer, the term of this patent is extended or adjusted under 35 U.S.C. 154(b) by 17 days.

(21) Appl. No.: 10/395,297

(22) Filed: Mar. 24, 2003

(65) Prior Publication Data

US 2003/0180509 A1 Sep. 25, 2003

Related U.S. Application Data

(62) Division of application No. 09/712,872, filed on Nov. 15, 2000.

(51) Int. Cl.[7] .......................... B29C 35/08; B29C 59/00
(52) U.S. Cl. ..................... 264/447; 264/485; 264/494; 264/509; 264/73; 264/74
(58) Field of Search ................................. 264/447, 485, 264/494, 509, 73, 74

(56) References Cited

U.S. PATENT DOCUMENTS

| | | |
|---|---|---|
| 3,658,620 A | 4/1972 | Hall |
| 3,785,850 A | 1/1974 | Parker |
| 3,924,023 A | 12/1975 | Boranian et al. |
| 3,984,584 A | 10/1976 | Brose et al. |
| 3,993,798 A | 11/1976 | Brose et al. |
| 4,048,036 A | 9/1977 | Prucnal |
| 4,056,453 A | 11/1977 | Barzynski et al. |
| 4,100,318 A | 7/1978 | McCann et al. |
| 4,113,894 A | 9/1978 | Koch, II |
| 4,118,366 A | 10/1978 | Brose et al. |
| 4,138,299 A | 2/1979 | Bolgiano |

(Continued)

FOREIGN PATENT DOCUMENTS

| | | |
|---|---|---|
| CA | 1 127 022 | 7/1982 |
| EP | 0 494 658 A2 | 7/1992 |
| EP | 0 984 045 A1 | 3/2000 |
| GB | 2 020 998 A | 11/1979 |
| GB | 2 182 337 A | 5/1987 |
| GB | 2 310 815 A | 9/1997 |
| JP | 4-5036 A | 1/1992 |
| WO | WO 84/00719 | 3/1984 |
| WO | WO 93/05227 | 3/1993 |
| WO | WO 99/10409 | 3/1999 |

OTHER PUBLICATIONS

Official Patent Abstract of Japanese Application No. 02105470, Derwent Publications LTD. (1002).
Advertisement from Energy Sciences, Inc. entitled "Electron Beam Basics" (1995).
Advertisement from Radtech International North America entitled "It's Quite Possible That You've Never Seen Light Used So Many Ways Before" (1995).
Advertisement from Energy Sciences, Inc. entitled "Safe Processing with Electrocure™ Electron Beam Curing Systems" (1995).

Primary Examiner—Suzanne E. McDowell

(57) ABSTRACT

A method and composition for providing a colored high performance wear surface for floor coverings is disclosed. Specifically, the floor covering includes a substrate and a high performance layer comprising a radiation cured pigmented composition. The exposed surface of the floor covering has a stain resistance of less than about 150 Delta E units. A pigmented high performance wear layer can be added in register with a printed design on the substrate or in register with an embossed texture of the substrate. Additionally, a high performance topcoat wear layer may be added. The pigmented high performance layer may include a nacreous pigment.

25 Claims, 11 Drawing Sheets

U.S. PATENT DOCUMENTS

| | | |
|---|---|---|
| 4,164,423 A | 8/1979 | Schumacher et al. |
| 4,169,167 A | 9/1979 | McDowell |
| 4,170,663 A | 10/1979 | Hahn et al. |
| 4,210,693 A | 7/1980 | Regan et al. |
| 4,289,798 A | 9/1981 | Bagley et al. |
| 4,303,695 A | 12/1981 | McCann et al. |
| 4,309,452 A | 1/1982 | Sachs |
| 4,313,969 A | 2/1982 | Matthews et al. |
| 4,326,001 A | 4/1982 | Sachs et al. |
| 4,393,187 A | 7/1983 | Boba et al. |
| 4,395,452 A | 7/1983 | Scher et al. |
| 4,405,657 A | 9/1983 | Miller, Jr. et al. |
| 4,418,109 A | 11/1983 | Miller, Jr. et al. |
| 4,438,480 A | 3/1984 | Chambaz et al. |
| 4,646,446 A | 3/1987 | Bubley |
| 4,880,689 A | 11/1989 | Park et al. |
| 4,971,855 A | 11/1990 | Lex et al. |
| 5,003,026 A | 3/1991 | Ehrhart et al. |
| 5,300,331 A | 4/1994 | Schaeffer |
| 5,401,560 A | 3/1995 | Williams |
| 5,405,675 A * | 4/1995 | Sawka et al. ............ 428/195.1 |
| 5,472,992 A | 12/1995 | Leppard et al. |
| 5,543,232 A * | 8/1996 | Ehrhart et al. .............. 428/482 |
| 5,545,476 A | 8/1996 | O'Dell et al. |
| 5,585,415 A | 12/1996 | Gorzalski |
| 5,719,227 A | 2/1998 | Rosenberry et al. |
| 5,747,115 A | 5/1998 | Howell et al. |
| 5,830,937 A * | 11/1998 | Shalov et al. ................ 524/297 |
| 5,843,576 A | 12/1998 | Rosenberry et al. |
| 5,985,376 A | 11/1999 | Kamen |
| 6,001,898 A | 12/1999 | Lutz |

* cited by examiner

PIGMENTED RADIATION CURED WEAR LAYER

This application is a division of application Ser. No. 09/712,872, filed on Nov. 15, 2000.

FIELD OF THE INVENTION

The present invention relates to a floor covering having a radiation curable high performance pigmented topcoat layer and a floor covering having a radiation curable high performance topcoat adjacent a radiation curable high performance pigmented wear layer.

BACKGROUND

Resilient floor coverings can be formed into sheets or individual tiles. Typically, in the manufacture of a resilient floor covering, a wear layer is combined with a substrate and resin to form the resilient sheet or tile. The substrate usually comprises a felted or matted fibrous sheet of overlapping, intertwined filaments or fibers. To the substrate is typically applied a substantially uniform layer of a liquid or semi-liquid resinous composition containing a synthetic polymeric material, usually an ungelled polyvinyl chloride plastisol and a blowing or foaming agent. The liquid or semi-liquid plastisol vinyl resin composition is subsequently firmed or gelled at an elevated temperature. This gelled plastisol may be printed with a decorative pattern or design having a blowing or foaming inhibitor for chemically embossing the substrate.

A wear layer is often applied to the surface of the polyvinyl chloride plastisol disposed on the substrate. Generally, the wear layer consists of a transparent layer that imparts resistance to puncture. These typically consist of a layer of transparent polyvinyl chloride, but urethane and urethane acrylates have been utilized. Additionally, there may also be applied another transparent topcoat layer that improves the stain and scratch resistance of the composite's surface. Examples of such wear layer composites can be found in U.S. Pat. Nos. 4,333,987, 4,180,615, 4,393,187 and 4,507,188.

A wear layer is any layer which improves the performance of the floor covering, such as an improved gouge, tear and rip resistance, improved stain resistance, or improved scratch resistance. A topcoat is a wear layer that has at least a portion that forms the exposed surface of the floor covering. A high performance wear layer or topcoat is a generally thin (less than about 3 mils) wear layer or topcoat formed from a radiation, e.g. ultraviolet (UV) or electron beam (EB), cured composition.

High performance wear layers or topcoats are cured by radiation to enhance their durability and finish. Radiation curable coatings are typically cured by exposure to ionizing irradiation or ultraviolet light. Such coatings are known in the art; for example, urethane coatings cured with ultraviolet light to provide protective wear layers for wall or floor tiles are described in U.S. Pat. No. 4,180,615. Additionally, in U.S. Pat. No. 3,918,393, there is described a method for obtaining a non-glossy coating on various substrates by curing radiation sensitive material with ionizing irradiation or ultraviolet light in two stages. In this process, the coating is partially cured in an oxygen-containing atmosphere and later completed in an inert atmosphere. In each of the above examples, the wear layer is unpigmented.

Unfortunately, radiation curable wear layers and topcoats are subject to substantial difficulties when coloring is added. Coloring is added by the addition of various pigments to the wear layer. The incorporation of pigment, especially enough pigment to make the coating opaque, produces a coating which is hard to cure and therefore reduces durability. There are no known floor coverings that include a pigmented high performance topcoat or a pigmented high performance wear layer which is covered by a high performance topcoat. Thus, there is a need for a pigmented high performance topcoat or a combination of a pigmented high performance wear layer/ high performance topcoat on the up areas of an embossed floor covering having a sufficient durability to function on a decorative floor covering.

SUMMARY

The present invention comprises both a method and composition for providing a pigmented high performance topcoat or the combination of a pigmented or unpigmented high performance topcoat and a pigmented high performance wear layer which is adjacent to the high performance topcoat for decorative floor coverings. Specifically, one embodiment of the decorative floor covering includes a substrate and a high performance topcoat comprised of a radiation cured pigmented topcoat wear layer having a stain resistance of about less than 150 Delta E units disposed on the substrate. The high performance topcoat may be unpigmented if it is applied over a second pigmented high performance wear layer. Only some portions of the topcoat and/or wear layer need to be pigmented. In one embodiment, the wear layer on the up areas of an embossed flooring surface is pigmented. In one embodiment the stain resistance is less than about 150 Delta E units.

In one embodiment, the pigment concentration is between about 0.25 to about 20 weight percent. In another embodiment, the pigment concentration is between about 1 and 10 weight percent. The cured pigmented high performance topcoat and/or wear layer can be added in register with a printed design or in register with an embossed texture of the substrate. Nacreous pigments can be used in either or both topcoat wear layers to get enhanced visual effects.

A further embodiment includes a decorative floor covering component comprising a film and a radiation cured pigmented high performance topcoat having a stain resistance of about less than 150 Delta E units disposed on the film. The radiation cured pigmented topcoat can also be disposed in register with a printed design on the film. The film may also comprise a radiation cured pigmented high performance wear layer and a radiation cured unpigmented high performance topcoat.

The method of manufacturing a decorative floor covering having a pigmented high performance topcoat includes manufacturing the decorative floor covering comprising applying a pigmented topcoat to a substrate and curing by radiation to form a topcoat having a stain resistance of about less than 150 Delta E units. The pigmented topcoat can, in one case, be cured by either radiation from ultraviolet or electron beam radiation. The substrate may also be mechanically or chemically embossed before or after applying the pigmented high performance topcoat. The substrate may also comprise a pigmented or unpigmented wear layer or pigmented or unpigmented high performance wear layer component, as well as a foamed or unfoamed resin layer.

Another embodiment includes a method for manufacturing a floor covering component. The floor covering component can be manufactured by applying a pigmented high performance topcoat to a film and curing the pigmented topcoat by subjecting the layer to radiation. The component can then be applied to a substrate. The film can also comprise a high performance wear layer onto which the pigmented high performance topcoat is applied and cured.

In another embodiment, a method for manufacturing a floor covering having an unpigmented high performance topcoat and a pigmented high performance wear layer adjacent the topcoat includes manufacturing the decorative floor covering by applying a pigmented high performance wear layer. In one embodiment the pigmented high performance wear layer is applied to the up areas of an embossed substrate. In either case, the pigmented high performance wear layer is at least partially cured and then an unpigmented high performance topcoat is applied and subjected to radiation to form a topcoat having a stain resistance of about less than 150 Delta E units. The pigmented wear layer can, in one case, be either radiation cured by ultraviolet or electron beam radiation. The pigmented high performance wear layer cures sufficiently to improve the wear performance of the unpigmented topcoat.

DETAILED DESCRIPTION

The present invention comprises both a method and composition for providing a pigmented radiation cured high performance topcoat for decorative floor coverings, or the combination of a pigmented or unpigmented high performance topcoat and a adjacent pigmented high performance wear layer. In one embodiment the pigmented wear layer is on the up areas of an embossed floor covering surface. Specifically, in one embodiment, the decorative floor covering includes a substrate and a high performance wear surface comprising a radiation cured pigmented high performance topcoat having a stain resistance of about less than 150 Delta E units disposed on the substrate.

Figure 1:
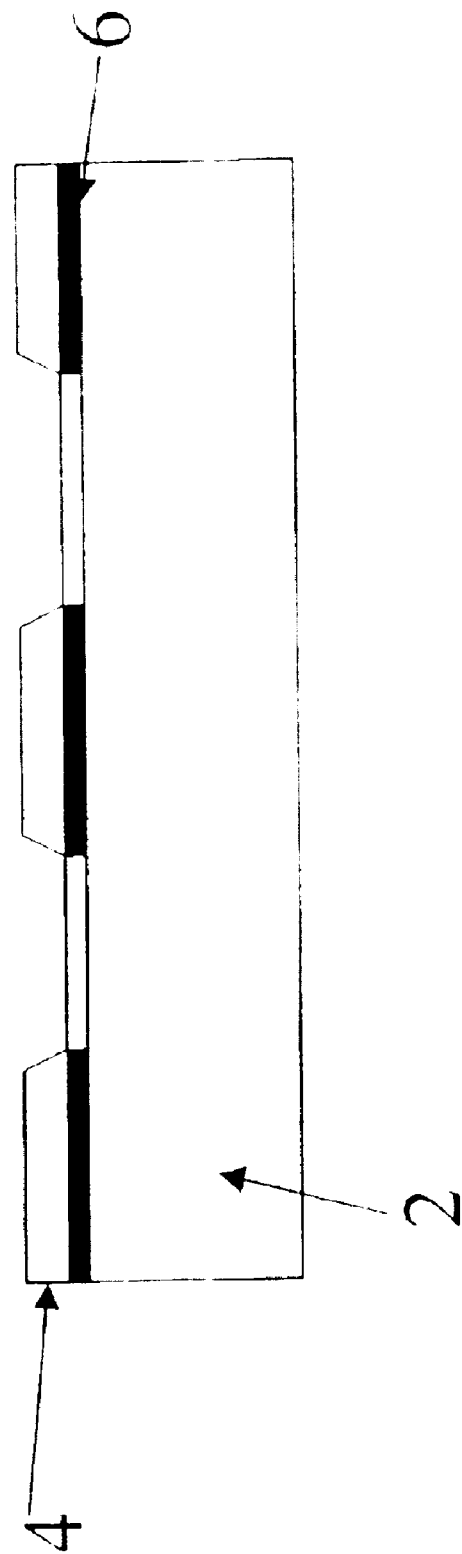
FIG. 1 is a cross-sectional view of a decorative floor covering having a pigmented radiation cured topcoat and a substrate wherein the topcoat is in register with a printed pattern on the substrate.

Referring to FIG. 1, the substrate 2 forms the base of the decorative covering and can be selected from, but not limited to, sheet, tile, strip, board, parquet, and the like. Such a substrate 2 can comprise monomers, polymers, plastics, resins, including reinforced resins, rubbers, papers, cloths, metals, wood, composites, veneers and laminates. The substrate 2 may be decorative and have any desired color or colors, printed characters, design, patterns, etc., as is the case with colored, printed, or decorative tiles, sheets, and laminates.

The substrate 2 can also comprise a wear layer or composite wear layer which can include a high performance wear layer or topcoat. Examples of substrates 2 which may be employed in the present invention are described in U.S. Pat. Nos. 6,006,486, 4,804,429, 4,574,065, 3,293,108, and 3,293,094 and PCT Patent Application Serial No. WO 99/66151, all of which are incorporated herein in their entirety by reference.

The pigmented high performance topcoat 4 and wear layer 5 (FIGS. 1 and 2) can comprise any radiation curable composition including those containing unsaturation such as acrylate, methacrylate, vinyl ethers, or maleic acid type polyesters, or those of irradiation active moieties such as radiation curable epoxy or epoxy acrylate systems. There is no limitation on the chemistry of the coating composition except that it can be cured while highly pigmented and has acceptable performance characteristics as a high performance flooring wear surface. Such high performance characteristics include a stain resistance of about less than about 150 Delta E units and gloss retention properties of about 80% or higher. Polyurethane acrylate and polyester acrylate compositions are examples which may be incorporated within the coating.

Figure 11:
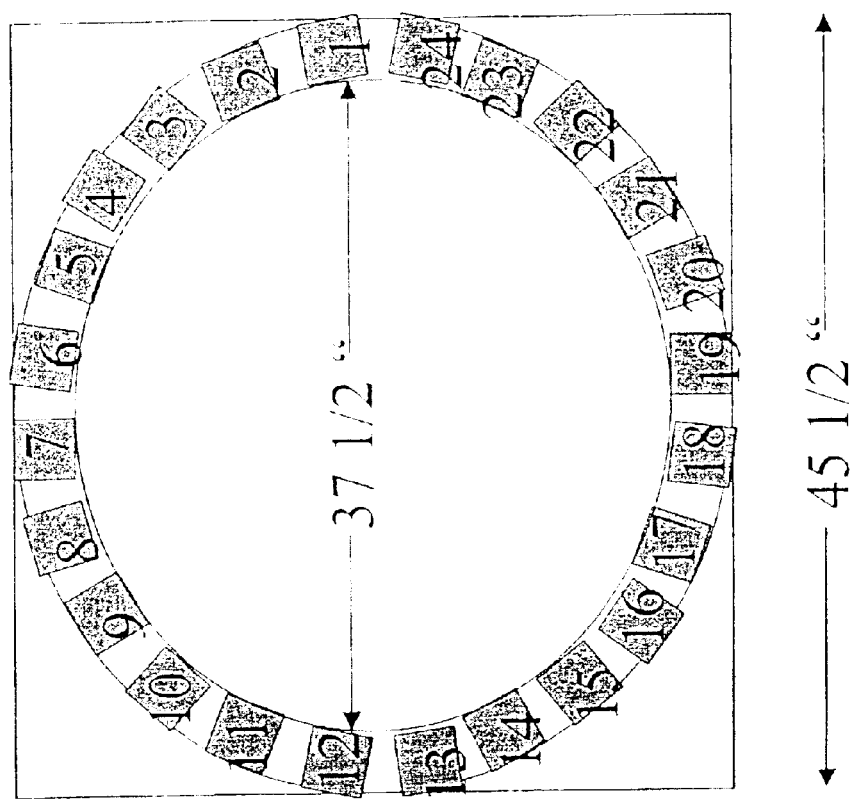
FIG. 11 illustrates a sample arrangement for a modified Tabor Abrader.

Examples of test procedures and definitions of such characteristics are disclosed in U.S. Pat. No. 5,843,576, which is incorporated herein in its entirety by reference. The Gloss Retention Test Procedure is described in this and the following two paragraphs. Flooring samples 4 inch by 4 inch were adhered to 4 inch by 4 inch by ¼ inch aluminum plates using two-faced tape and conditioned at least 24 hours at 73.4° F. and 50% humidity. Initial Gloss readings (average of 20 readings) were taken on each sample using a Hunter Lab Gloss Meter and recorded. These samples were placed into a large scale Tabor Abrader consisting of a flat, round aluminum table with 24, 4 inch by 4 inch by ¼ inch cutouts with an inside diameter of 37½ inches and an outside diameter of 45½ inches (See FIG. 11). A 4 inch wide leather abrading wheel traveled around the table contacting the surface of the flooring samples. The wheel was attached to a center arm mechanism that moved the wheel around the table at 7.6 revolutions a minute. The wheel was also independently driven so that wheel rotated at 25 rpm independent of the center arm. This imparts a positive "slip" between the flooring samples and the leather surface of the wheel.

The leather abrading wheel consisted of a 20 inch diameter aluminum wheel weighing 40 lbs., and covered with a 4 inch wide, ½ inch thick high density elastomeric foamed sheet (Astroturf Backing of about 10 lbs./cubic foot density, obtained from Armacell LLC, 7600 Oakwood Street Extension, PO Box 1038, Mebane, N.C. 27302) adhered to the aluminum wheel with two faced tape. A 4 inch leather belt, $^{14}/_{64}$ inches thick; 66 ⅝ inches net length (69 ⅝ inch gross length skived 3 inches from each end for overlap) was obtained from R/W Connection, 936 Links Ave, Landisville, Pa. 17538, and adhered to the face of the elastomeric foamed sheet with two-faced tape providing an essentially continuous leather belt surface.

The center arm was also equipped with a "soil" feeder directly opposite the wheel that deposits soil on the flooring samples at a rate of 2.8 grams over 15 seconds, every 5 minutes and was gently brushed across the samples. The soil feeder was equipped with a timing device so that the "depositing time" was set for 15 seconds, and the time between soil application was set for 4 minutes and 45 seconds. The soil consisted of 90% by weight PVC dryblend (100 phr Vygen 85 PVC resin and 33.3 phr of DOP (dioctyl phthalate) plasticizer. The dry blend was made in a Henschel mixer so that the plasticizer was absorbed and a dry powder obtained.) and 10% by weight #240 aluminum oxide obtained from Tabor Industries.

After 15 minutes into the test, the flooring samples were rotated 90 degrees and testing resumed. The flooring samples were rotated 90 degrees (in the same direction) after each 15 minute period for a total of 90 minutes. Samples were removed and cleaned by gently wiping with a soft cloth and gloss readings taken (average of 20 readings). The percent gloss retention after 90 minutes was calculated by the following equation:

(Initial Gloss−90 Minute Gloss)/Initial Gloss=% Gloss Retention

Figure 2:
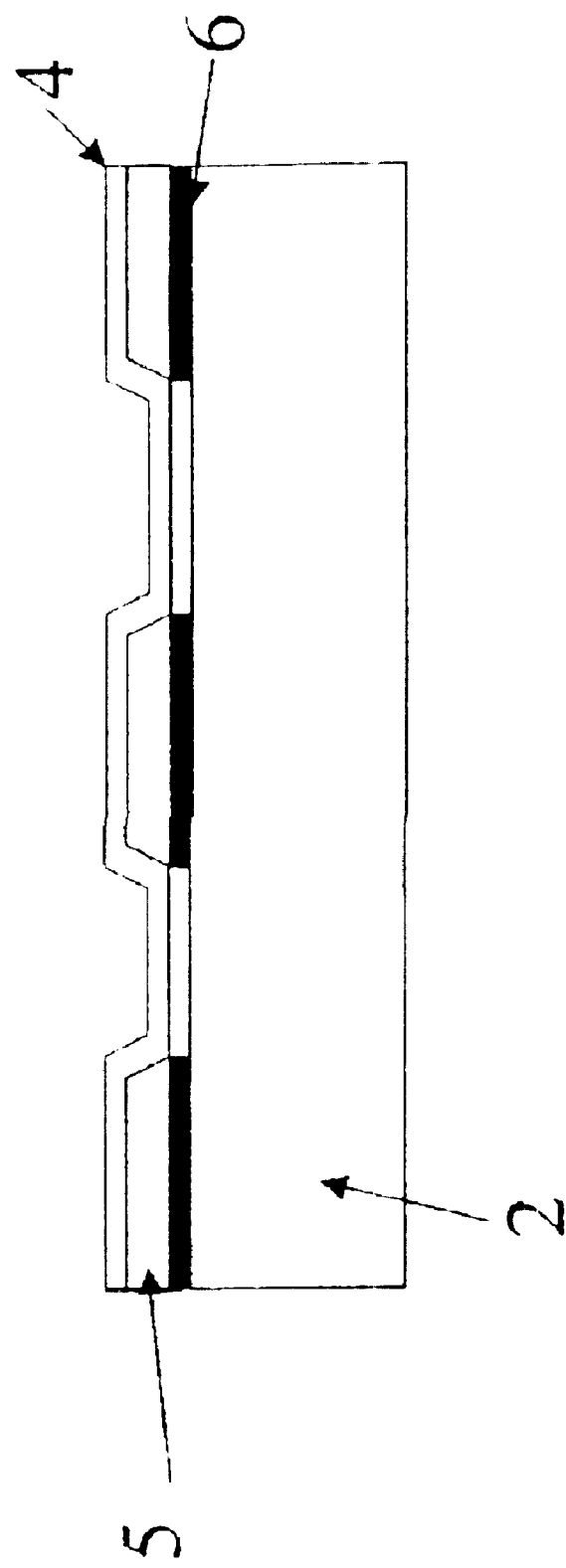
FIG. 2 is a cross-sectional view of a decorative floor covering having a pigmented high performance wear layer, a unpigmented radiation cured topcoat and a substrate wherein the high performance wear layer is in register with a printed pattern on the substrate and the topcoat is applied to substantially the entire substrate.

The pigmented topcoat 4 may be applied as a single coating, as shown in FIG. 2, or as a plurality of coatings, as shown in FIG. 1. Additionally, two or more pigmented topcoat layers may be incorporated into the decorative floor covering. When the high performance topcoat is pigmented, it can be adjacent to a pigmented or unpigmented high performance wear layer. When the topcoat is unpigmented, it is adjacent a pigmented high performance wear layer.

The pigmented high performance topcoat 4 and wear layer 5 may be cured by exposure to electron beam irradiation. Depending upon thickness of the pigmented topcoat, the e-beam conditions can vary from 2 to 20 Mrad of exposure for electron energies associated with 100 to 500 KeV e-beam units. For topcoats that are in the range of 0.2 to 2 mils, electron energies of about 125 KEV are preferred with exposures of about 2 to 5 Mrad.

The pigmented high performance topcoat 4 and wear layer 5 can also be cured by exposure to ultraviolet light energies. Standard medium or high pressure mercury vapor type UV lamps with wavelengths of about 1800 to 4000 Angstrom units can be employed, as well as UV lamps containing additives to enhance specific UV regimes, e.g. V or D type bulbs. UV radiation exposure can usually vary from about 1 to 6 joules/sq. cm depending upon topcoat thickness and pigment loading level. Additionally, photo-sensitizers can be selected to increase curing rate and sensitivity to specific wavelengths of UV light. The formulations can be either cured in air or nitrogen depending upon chemistry and photosensitizers. However, depending upon the chemistry, better stain resistance and gloss retention properties are generally obtained when final cure is done under an inert atmosphere such as nitrogen.

Types of photoinitatiors and photosensitizers that are useful for this invention include but are not limited to those summarized below in Tables 1 and 2.

TABLE 1

List of Photoinitators

| Trade Name | Chemical Name | Supplier |
| --- | --- | --- |
| Darocur 1173 | 2-hydroxy-2-methyl-1-phenyl-propan-1-one | Ciba Geigy |
| Irgacure 184 | 1-hydroxycyclohexyl phenyl ketone | Ciba Geigy |
| Darocur 4265 | 50% 2-hydroxy-2-methyl-1-phenyl-1one and 50% 2,4,6-trimehtylbenzoyldiphenylphosphine oxide | Ciba Geigy |
| Irgacure 907 | 2-methyl-1-[-4-methylthio)phenyl]-2-morpholino propan-1-one | Ciba Geigy |
| Irgacure 1700 | 25% bis (2,6-dimethoxybenzoyl)-2,4-,4-trimethylpentyl phosphine oxide and 75% 2-hydroxy-2-methyl-1-phenyl-propan-1-one | Ciba Geigy |
| Darocur BP | Benzophenone | Ciba Geigy |
| Irgacure 819 | BAPO Phenyl bis(2,4,6-trimethylbenzoyl)-phosphine Oxide | Ciba Geigy |
| Lucrin | MAPO Dipheny(2,4,6-trimethylbenzoyl)-phosphine oxide | Ciba Geigy |
| Irgacure 651 | alpha, alpha-dimethoxy-alpha-phenylacetophenone | Ciba Geigy |

TABLE 2

List of Photosensitizers

| Trade Name | Chemical Name | Supplier |
| --- | --- | --- |
| ITX | isopropyl thioxanthone | Aceto |
| CTX | Chlorothioxanthone | Aldrich |
| Michlers Ketone | 4,4'-Bis(dimethylamino)benzophenone | Aldrich |
| | Thioxanthone | Aldrich |
| | Benzanthrone | Aldrich |
| | triphenyl acetophenone | |
| | Fluorenone | |

As illustrated in FIGS. 1 and 2, the pigmented high performance topcoat 4 or wear layer 5 can be printed in register with a design in print layer 6 which is disposed on the flooring substrate 2. This positions the pigmented high performance topcoat or wear layer for enhanced visual effects. The topcoat 4 or wear layer 5 can be printed onto the substrate 2 using various methods and apparatuses, such as screen printers, intaglio and flexo. The printing of the topcoat 4 or wear layer 5 is not limited to any specific printing method so long as the method can achieve registration when registration is desired and achieve sufficient material application to perform as a flooring surface.

Figure 3:
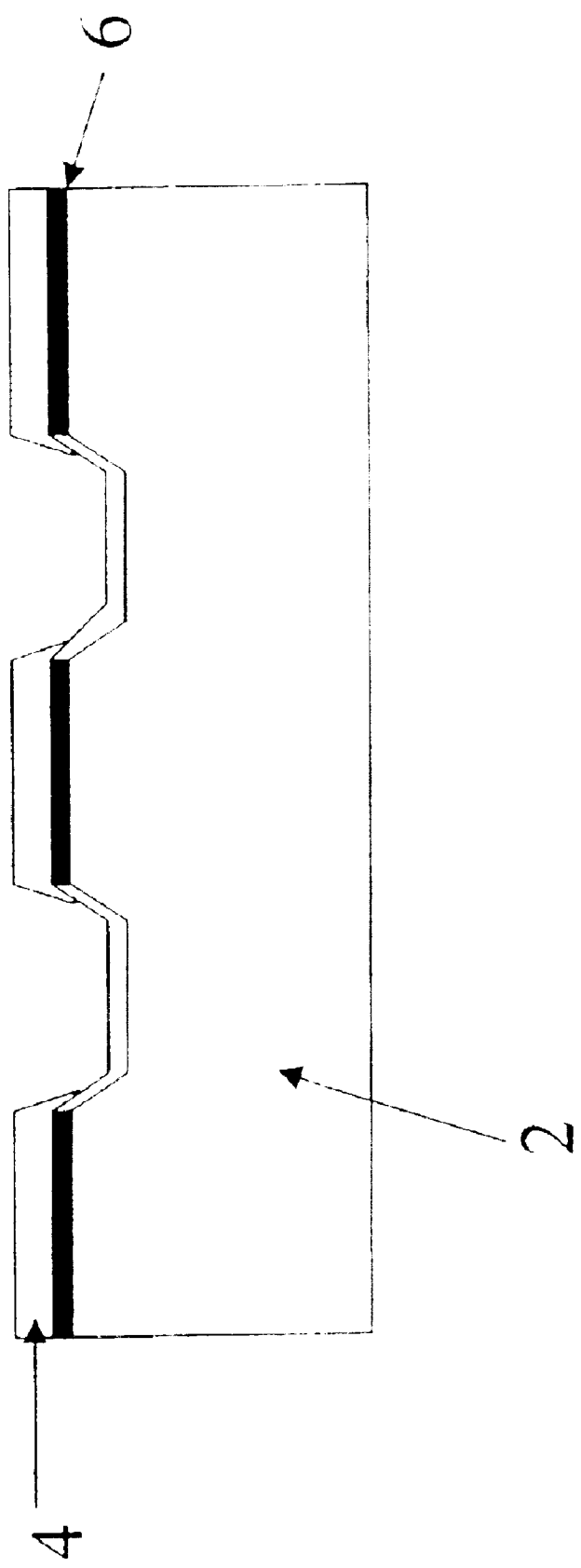
FIG. 3 is a cross-sectional view of a decorative floor covering having a pigmented radiation cured topcoat and a substrate wherein the topcoat is in register with an embossed pattern.
Figure 4:
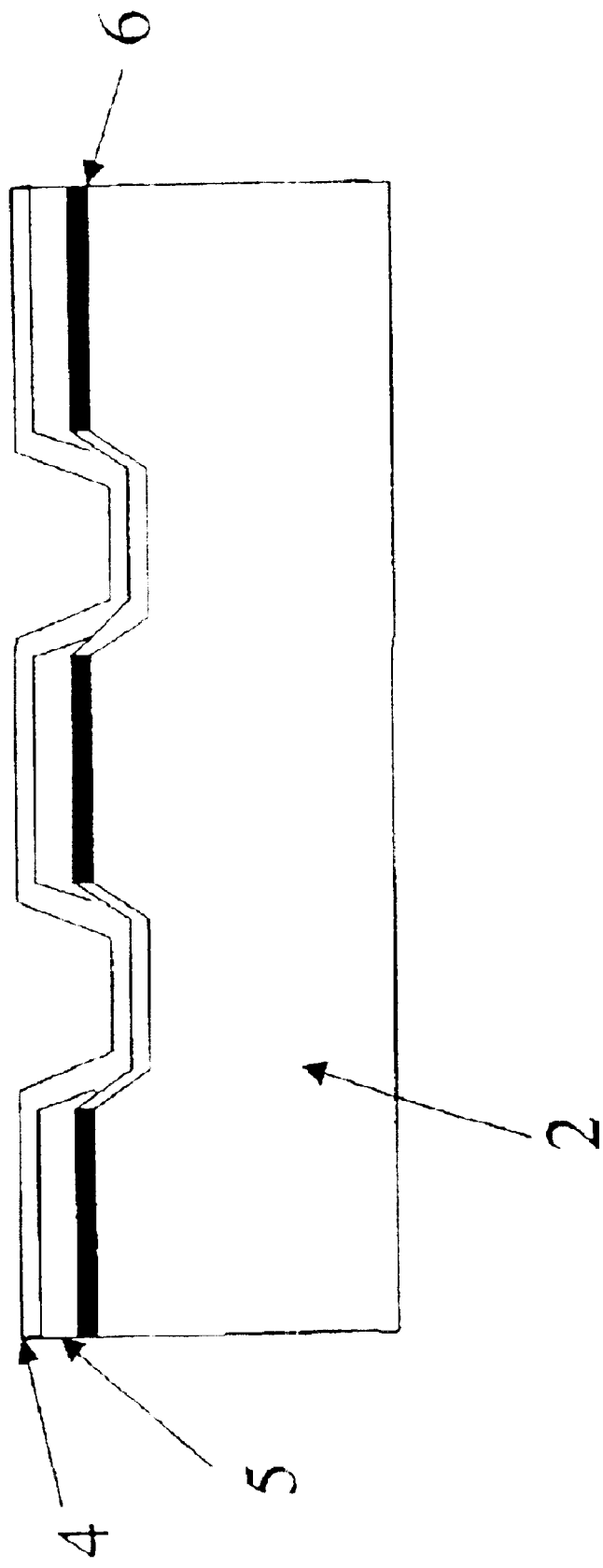
FIG. 4 is a cross-sectional view of a decorative floor covering comprising a pigmented radiation cured high performance wear layer, pigmented or unpigmented radiation cured topcoat and a substrate wherein the high performance wear layer is applied to the substrate in register with a printed and/or embossed design, and the topcoat is applied to substantially the entire substrate.

In a further embodiment illustrated in FIG. 3, the printed substrate of FIG. 1 can be chemically embossed and/or mechanically embossed. Additionally, the physical performance of the non-printed regions may be enhanced by the application of a radiation cured high performance topcoat 4 as shown in FIG. 4. In this embodiment, the pigmented high performance layers which are in register with the printed portions of print layer 6 are adjacent to and below the topcoat 4 and therefore become pigmented high performance wear layers 5. The high performance topcoat 4 may include pigments for added visual effects.

Figure 5:
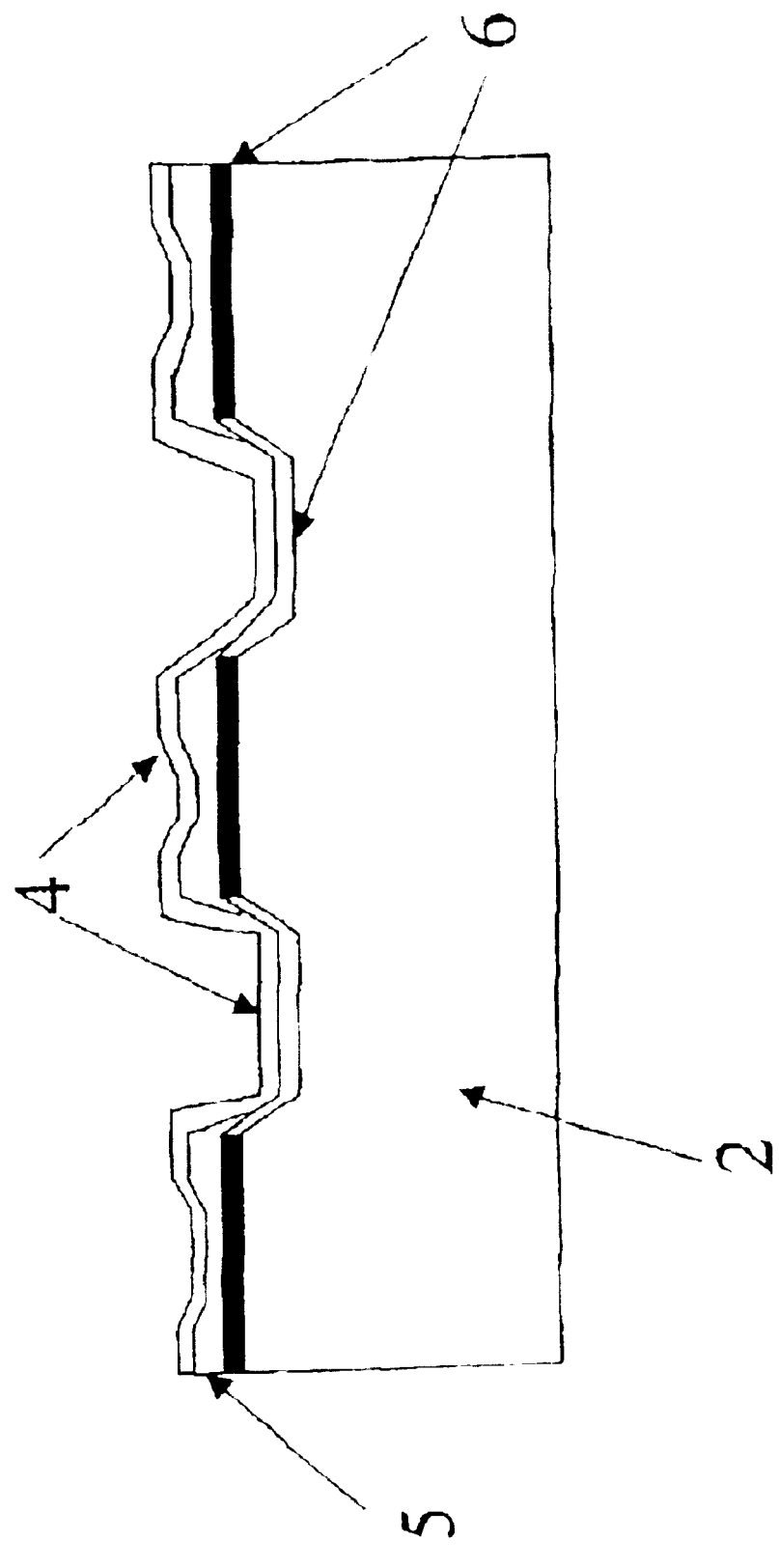
FIG. 5 is a cross-sectional view of FIG. 4 wherein the up areas have been mechanically embossed with a fine embossing pattern.

Additionally, the pigmented high performance topcoat or wear layer can be screen printed in register with the substrate after the substrate is chemically and/or mechanically embossed. Further, the up areas of FIG. 4 can be mechanically embossed with a fine embossing pattern as shown in FIG. 5. Embossing changes the surface texture in the printed regions, which can be used to create additional visual effects.

Figure 6:
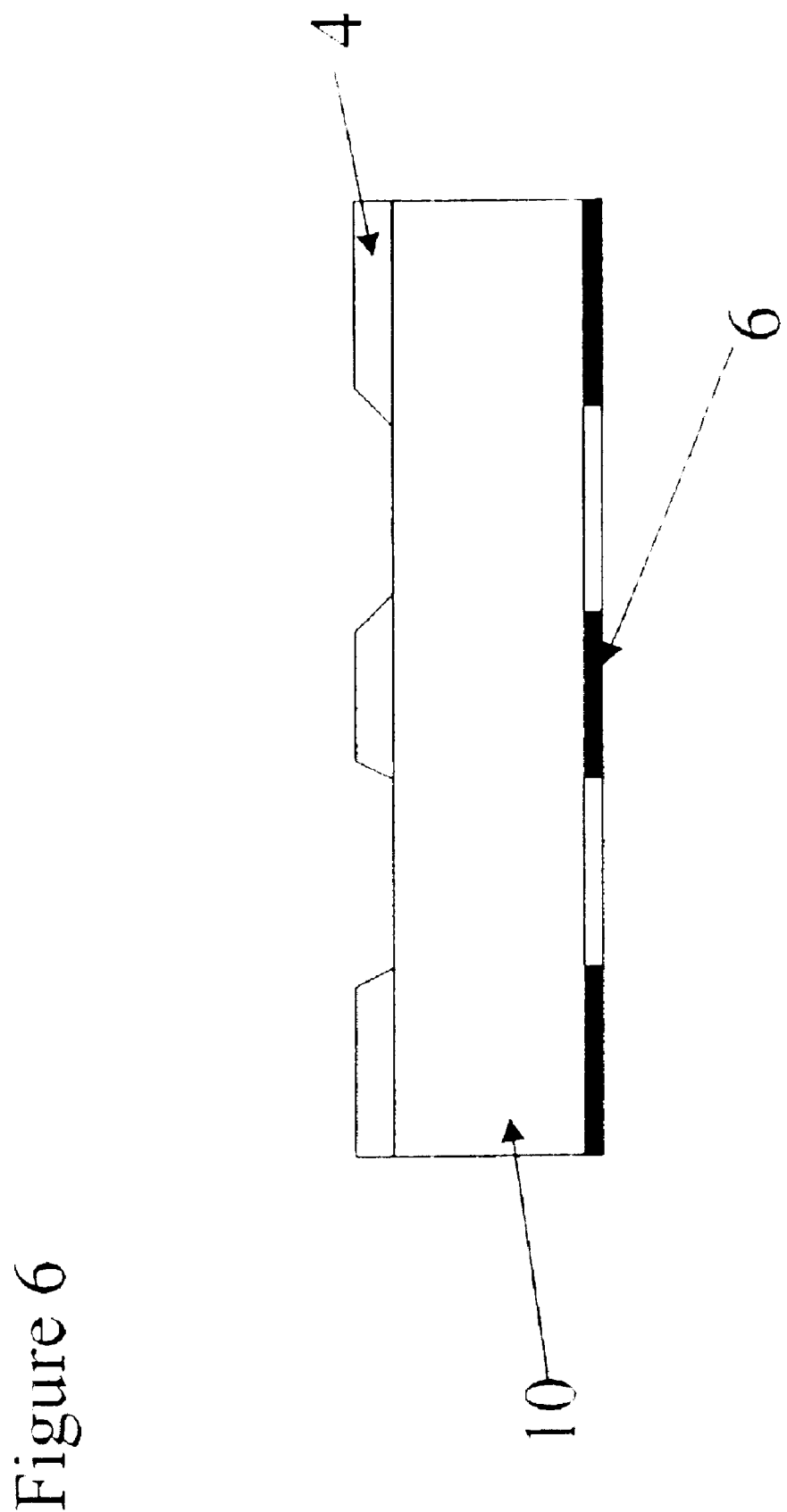
FIG. 6 is a cross-sectional view of the back printed film and applied pigmented radiation cured topcoat layer.
Figure 7:
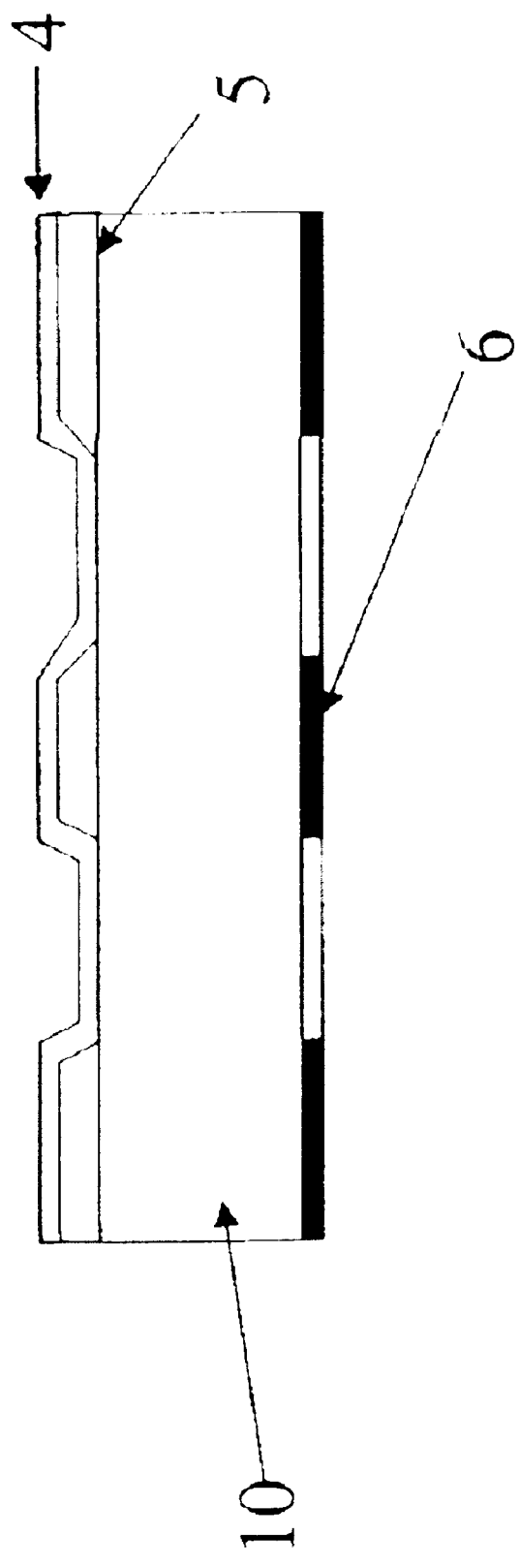
FIG. 7 is a cross-sectioned view of a back printed film with applied pigmented radiation cured high performance wear layer and topcoat.

In an additional embodiment, the colored high performance topcoat can be printed in a pattern on the opposite side of a back printed film 10, as illustrated in FIGS. 6 and 7. The printed high performance topcoat 4 or wear layer 5 can be in register with the back printed pattern 6 for enhanced visual effects. If desired, a second topcoat can be applied that may or may not also comprise pigments for enhanced visual effects. The film 10 can itself be a composite film. It can also comprise a high performance topcoat layer opposite the printed surface. Additionally, the film 10 does not have to be back printed. The resulting film composite may be laminated to a flooring substrate and chemically and/or mechanically embossed to produce a flooring product.

Figure 8:
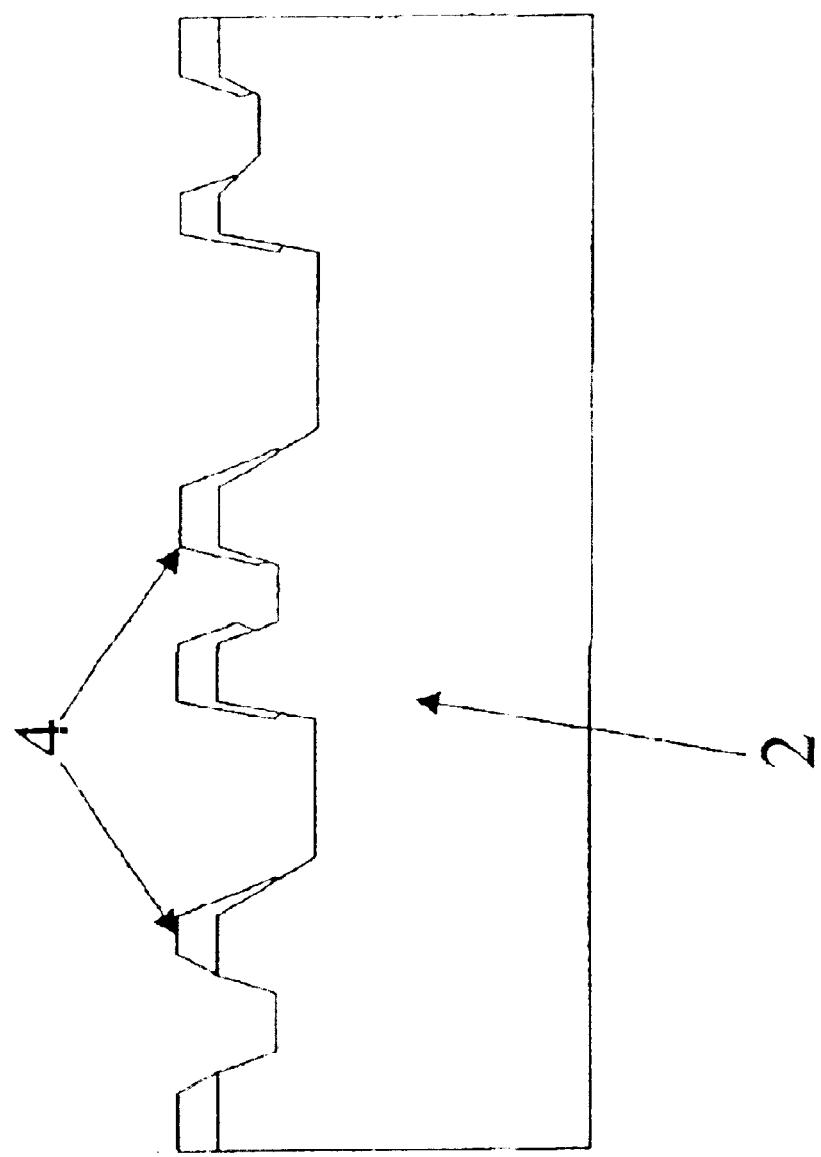
FIG. 8 is a cross-sectional view of a decorative floor covering illustrating a covering produced by a "kiss coating" process wherein the topcoat is applied to the raised portions of the decorative floor covering.

A further embodiment includes "kiss-coating" the topcoat 4 onto the up-raised areas of an embossed substrate 2 or embossed film/substrate composite as illustrated in FIG. 8. A clear high performance topcoat can also be "kiss coated" on top of a pigmented radiation curable high performance wear layer composition and subsequently cured to provide a unique visual effect while achieving high wear performance. A differential direct roll coater or other equipment that can easily transfer the coating from the applicator of the coater to the up areas can be utilized. The resulting material can be over coated with an additional clear or pigmented high performance topcoat if desired.

Figure 9:
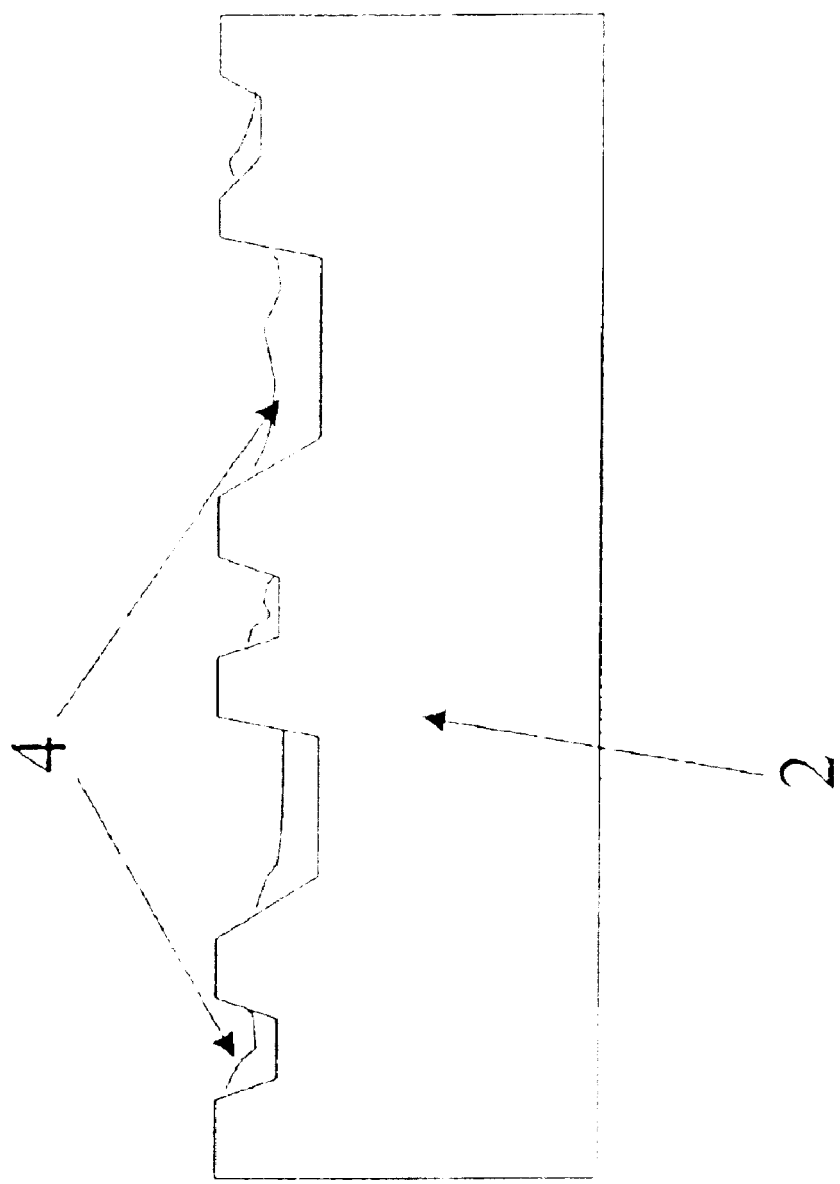
FIG. 9 is a cross-sectional view of a decorative floor covering illustrating a covering produced by a "shade wiping" process wherein the topcoat is applied to the recesses of the decorative floor covering.

An additional method of applying the high performance topcoat 4 to an embossed film or flooring substrate includes "shade wiping" which is described in U.S. Pat. Nos. 3,933,401 and 3,790,436 which are incorporated herein by reference. "Shade wiping" is a decoration term that implies the uneven application of a colored material (usually ink) onto an embossed or textured surface where more of the colored material stays in the deeper embossed regions relative to shallower embossed regions. The colored high performance topcoat composition 4 can be "shade wiped" into an embossed film or an embossed decorated flooring substrate 2 as shown in FIG. 9. This provides enhanced visual effects not achievable by decoration techniques below a clear wear surface. The specific method of shade wiping can be carried out by any process known in the art such as by flexible blade or appropriately positioned air knife coater.

Figure 10:
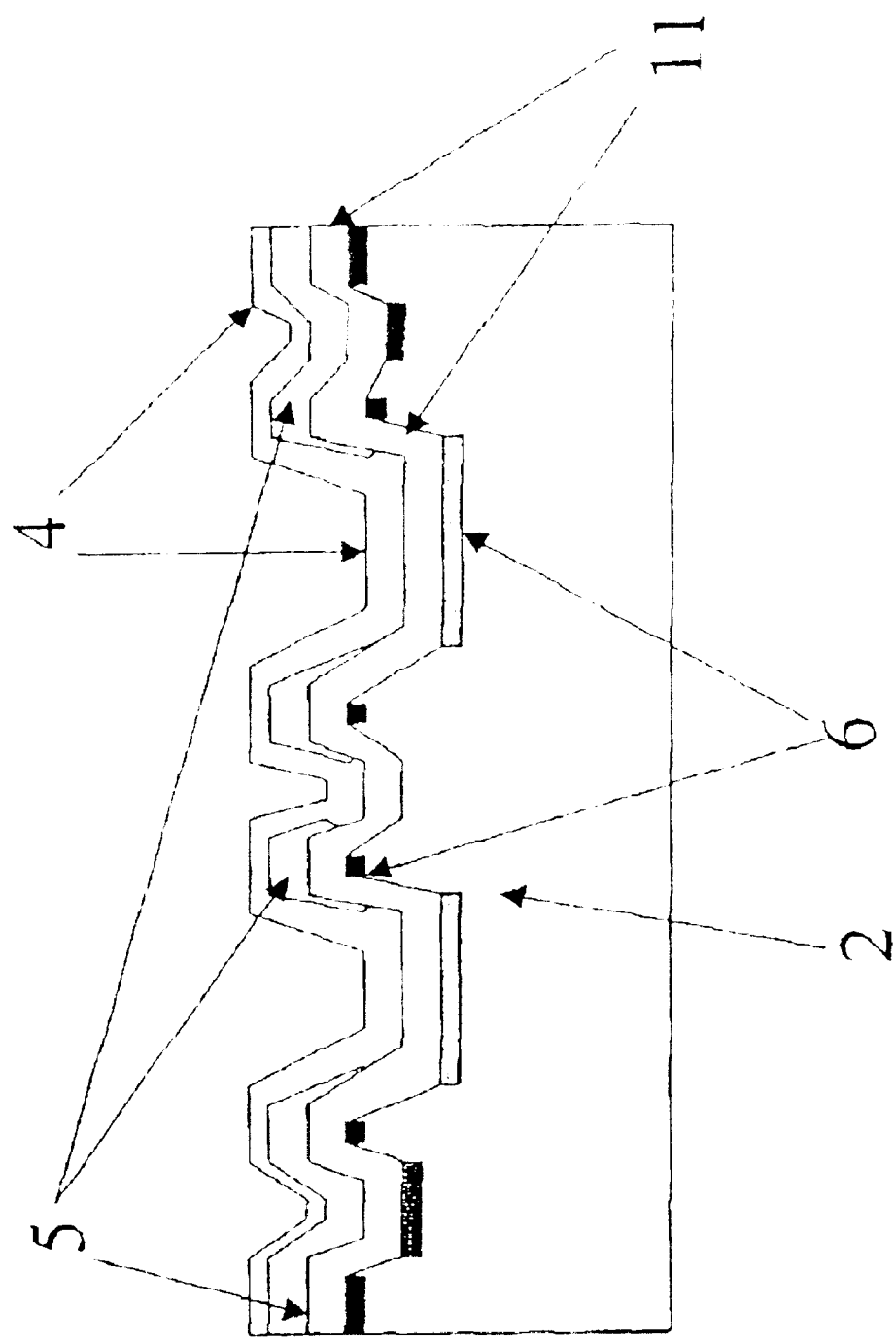
FIG. 10 is a cross-sectional view of a decorative floor covering illustrating a floor covering produced by chemically embossing a substrate having a wear layer covering the entire surface of the floor and then screen printing a radiation cured high performance wear layer in register, mechanically embossing the composite and applying a high performance topcoat over substantially the entire surface of the covering.

FIG. 10 shows a cross-sectional view of a decorative floor covering illustrating a floor covering produced by chemically embossing a substrate 2. The substrate 2 is printed with design pattern 6. Then a wear layer 11 is applied covering the entire surface of the floor covering and a screen printed radiation cured high performance wear layer 5 is applied in register with the areas which become up areas when the composite is mechanically embossed. A high performance topcoat 4 is applied over substantially the entire surface of the covering either before or after the mechanical embossing step.

There are no limitations to the nature of the pigments that can be utilized in this invention as long as the topcoat or wear layer achieves high performance properties after radiation curing. Additionally, the pigments should be color stable in the radiation curing process and the final resulting flooring product.

Incorporating nacreous pigments and especially interference color pigments into the topcoat wear-surface composition aid in creating an interaction with the light and dark portions of the printed patterns below the nacreous pigments. Nacreous pigments include those pigments having iridescence, such as in mother-of-pearl or pigments having a lustrous or attractive quality or effect. Examples of such pigments can include AFFLAIR Lustre pigments, AFFLAIR Ultra Interference pigments, and AFFLAIR Ultra Sparkle pigments obtained from EM Industries Inc., 5 Skyline Drive, Hawthorn, N.Y. 10532; and MEARLIN, CELLIN, TIMICA, FLAMENCO, DUOCROME, CLOISONNE and GEMSTONE pigments available from Engelhard Corp., Iselin, N.J., 00830-0770. Nacreous pigments may also be included in a second topcoat layer.

The following examples are intended to illustrate the invention and it is thought variations will occur to those skilled in the art. Accordingly, it is intended that the scope of the invention should be limited only by the appended claims.

EXAMPLES

Example 1

A hydroxyl terminated polyester (PE1) was prepared as per example 1 of U.S. Pat. No. 5,663,003 which is incorporated herein by reference. The polyester was prepared based upon the following composition:

| | |
|---|---|
| 1,6 hexanediol | 992.7 g |
| Glycerine | 133.5 g |
| Phthalic Anhydride | 1071 g |
| Dibutyltin Dilaurate | 0.5 g |

The reaction mixture was cooled, and the final product gave an Acid No. of 2.4 and a Hydroxyl No. of 179.

A coating composition was prepared as described in U.S. Pat. No. 5,719,227, which is incorporated herein by reference. The following composition was charged into a 2 L flask equipped with heating mantel, stirrer, and dry air purge at 0.25 SCFH:

| | |
|---|---|
| Tone M-100 Hydroxyacrylate from Union Carbide | 126 g |
| Monomer Mixture (27.5% by wt Sartomer SR499, 27.5% by wt Sartomer SR502, 45% by wt of Sartomer SR351) | 125 g |
| PE1 | 35 g |

The mixture was heated to 100° F. and 87 g of Desmodur N 3300 isocyanurate trimer from Bayer Corp was added. The mixture was heated to 185° F. and maintained for 5 hours. The mixture was cooled and to the composition was added with stirring Monomer mixture (27.5% by wt Sartor SR499).

| | |
|---|---|
| 27.5% by wt Sartomer SR502, 45% by wt Sartomer SR351) | 15 g |
| Surfactant Dow Corning 193 | 1 g |
| Benzophenone | 4 g |
| (this resulted in topcoat composition #1) | |

Example 2

Topcoat composition #1 was formulated with $TiO_2$ pigment obtained from Huntsman (R-HD6X) and additional UV photoinitiators. The compositions were preheated and coated onto a back printed rigid vinyl film at a 2 mil thickness. The coated film was routed over a 12.75 inch heated drum maintained at about 150° F. At about 90° wrap, the film is exposed to UV irradiation either from a conventional medium pressure mercury vapor lamp or a doped (V bulb) lamp having a spectral output over the entire UV range 200–450 nm. The coated pigmented wear layer film is then laminated to a tile base. The coating had excellent adhesion and had acceptable flooring wear performance as judged from a modified Taber abrasion test. Illustrated in Table 1 are the various formulations of $TiO_2$ pigmented coatings. The amounts are in parts by weight unless otherwise specified.

TABLE 1

Formulations of Pigmented Coatings For Example 1

| | A | B | C |
|---|---|---|---|
| Composition 1 | 460 | 435 | 375 |
| White Pigment | 25 | 50 | 120 |
| Isodecyl acrylate (IDA) | | | 110 |
| Acrylic Acid | | | 15 |
| Lucrin TPO | 7.5 | 4 | |
| Irgacure 4265 | | | 16 |
| Daracure 1173 | 7.5 | 7.5 | |
| Irgacure 907 | | | |
| ITX | | | |
| DC193 | 1.25 | 1.25 | 1.25 |
| Pigment conc | 5 | 10 | 19 |
| Coating Temperature (deg F.) | 148 | 141 | 114 |
| UV Intensity (mW/cm2) | 914 | 837 (UVV) | 837 (UVV) |

TABLE 1-continued

Formulations of Pigmented Coatings For Example 1

| | A | B | C |
|---|---|---|---|
| UV Bulb Type | H | V | V |
| Dosage (J/cm2) | 2.4 | 2.5 (UVV) | 2.5 (UVV) |
| Thickness of Coating | 2.1 | 2.2 | 1.9 |
| Cross Hatch Adhesion | Pass | Pass | Pass |
| Modified Taber Abraision Test | Pass | Pass | Pass |

Example 3

Top coat composition #1 was formulated with a pearlescent pigment (Golden Bronze 2,24 um, from Mearl Corp.), coated onto rigid vinyl film, and UV cured as per Example 2 using a medium pressure mercury vapor lamp. The cured topcoat has acceptable performance for use in flooring applications.

TABLE 2

Formulations of Pigmented Coatings For Example 3

| | A | B | C |
|---|---|---|---|
| Composition 1 | 488.75 | 485 | 480 |
| Pearl Pigment | 1.25 | 5 | 10 |
| Irg 184 | 5 | 5 | 5 |
| Benzophenone | 5 | 5 | 5 |
| Pigment Loading (% wt) | 0.25 | 1 | 2 |
| Intensity (mW/cm2, H bulb) | 914 | 914 | 914 |
| Dosage (J/cm2, UVA, H bulb) | 2.4 | 2.4 | 2.4 |
| Thickness of Coating (mils) | 2 | 2 | 2 |
| Cross Hatch Adhesion | Pass | Pass | Pass |
| Modified Taber Abraision Test | Pass | Pass | Pass |

Example 4

The following additional topcoat compositions and pigment combinations were radiation cured and evaluated.

TABLE 3

| TopCoat | Pigment | Pigment Mfg. | % Loading (wt) | Thickness | Cure |
|---|---|---|---|---|---|
| #1 U.S. Pat. No. 5,663,003 Example 1 | Afflair Pearl | EM Industries | 5% | 1–4 mils | EB, UV |
| #2 U.S. Pat. No. 5,663,003 Example 1 | Pennco Green 9G5inTMPTA | Penn Color | 1% | 1–2 mils | EB |
| #3 U.S. Pat. No. 5,891,582 Example 1 | Infinite Color Silver/Gold | Sheshiedo | 1.2% | 1–3 mils | UV |
| #4 U.S. Pat. No. 5,891,582 Example 1 | Infinite Color Purple | Sheshiedo | 1%–3.1% | 1–3 mils | UV |
| #5 U.S. Pat. No. 5,891,582 Example 1 | Infinite Color Blue GBG05SKE | Sheshiedo | 1.5% | 2–3 mils | UV |

The cured topcoats of table 3 were evaluated as done in Example 2 and shown to possess acceptable performance for use as high performance wear-surfaces in flooring products.

Example 5

A cushioned vinyl flooring substrate was prepared by applying and gelling a 5 mil plastisol base coat layer onto a felt backing layer (ca. 25 mils). A foamable plastisol composition (10–11 mils) was then applied and gelled on top of the plastisol basecoat layer. The felt/basecoat/foamable composite was then rotogravure printed with at least one roto print ink containing a chemical embossing inhibitor. The printed composite was then coated with a clear vinyl plastisol wear layer formulation and subsequently gelled. Onto this printed flooring substrate, the UV coating formulation #1 in Example 4, was applied in register with the rotogravure printed design at a thickness of about 1 mil. The composite was then heated, and the foamable layer expanded to 20 mils through a standard fusion oven at 191° C. for 1.7 minutes, and the UV coating cured by passing under UV lamps after it exits the fusion oven. The UV dosage was about 2.0 $J/cm^2$. The resultant product had a pigmented high performance topcoat in register with the printed design.

Example 6

The unpigmented UV coating of formulation #1 in Example 4 was applied overall to the product of Example 5 and subsequently UV cured at a dosage of 2.6 $J/cm^2$. The resultant product now comprises a two-component UV cured topcoat/wear layer composite with one component pigmented and in register with the substrate printed design and one adjacent unpigmented component.

Example 7

A cushioned vinyl flooring substrate is prepared with a chemically embossed and mechanically embossed vinyl wear-surface. The pigmented UV curable topcoat of Example 2 is applied by "kiss coating" the up regions of the embossed vinyl flooring substrate surface so that the pigmented topcoat is only applied to up regions of the pattern. The "kiss coated" topcoat is then UV cured by passing it under UV lamps. The resultant product has a pigmented high performance topcoat located on the up regions imparting an enhanced visual effect.

Example 8

The product of Example 7 is post coated overall with a second UV curable topcoat formulation #3 from Example 4 containing a nacreous, interference pigment composition. This second high performance topcoat interacts with light and dark color regions of the pattern differently and imparts additional enhanced visual effects.

Example 9

A cushion vinyl flooring substrate with vinyl wear layer is chemically and mechanically embossed as described in U.S. Pat. No. 5,961,903 and incorporated herein by reference. An unpigmented high performance topcoat of formulation 1 in Example 4 is air-knifed coated onto the embossed product at a thickness of about 1 mil such that the embossing texture is substantially maintained and subsequently partially cured by exposure to UV radiation. The topcoat formulation of Example 2 is "shade wiped" into the embossing texture using a flexible blade coater and subsequently the composite topcoat/wear layer is UV cured producing a high performance wear surface. The final visual has unique visual effects due to varying degrees of opacity that cannot be duplicated by printing techniques.

Example 10

A chemically embossed vinyl flooring substrate with a vinyl wear layer is prepared. Pigmented UV coating composition of Example 3 is screen printed in register with the substrate design pattern and partially cured by UV. The substrate is then mechanically embossed as in U.S. Pat. No. 5,961,903 and subsequently air-knife coated with a second unpigmented UV topcoat (formulation 1 of Example 4) and the UV topcoat composite is completely cured by passing under UV lights resulting in a high performance topcoat/wear layer surface.

Example 11

The topcoat formulation from Example 3 is intaglio printed onto the top surface of a back printed, rigid vinyl film in register with the back printed design. The topcoat formulation is partially cured by exposure to 125 KeV EB radiation. The resultant discontinuous top coated film is then overcoated with an unpigmented topcoat formulation and the entire topcoat composite completely cured by exposure to 4 Mrads of 125 KeV EB radiation. The resultant topcoat/wear layer composite film is laminated onto a flooring tile base and subsequently mechanically embossed in register with the back printed design.

Example 12

A rigid vinyl firm is rotogravure back printed, wherein at least one of the rotogravure inks contains a chemical embossing inhibitor. This back printed film is subsequently topcoat printed in register as per Example 11 to produce a partially EB radiation cured registered topcoat/back-printed film. This registered topcoat/back-printed film is subsequently laminated onto the felt/foamable composite of Example 5 and processed similar to Example 5 to produce a chemically embossed cushioned vinyl structure with the film/topcoat surface. This structure is subsequently air-knife coated with an unpigmented UV curable composition of Example 1 and subsequently cured by exposure to UV irradiation. The final flooring product has a radiation cured high performance wear layer/topcoat surface.

While specific embodiments have been set forth as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A method of manufacturing a decorative floor covering comprising the steps of:
   providing a substrate;
   applying a pigmented topcoat to the substrate; and
   curing the pigmented topcoat by subjecting the layer to radiation selected from the group consisting of ultraviolet light, electron beam radiation and both ultraviolet light and electron beam radiation to form a topcoat having a stain resistance of less than about 150 Delta E units, the topcoat consisting essentially of at least one thermoset polymer and an ingredient selected from the group consisting of at least one pigment, at least one photoinitator, at least one photosensitizer, at least one surfactant, at least one reactive monomer and combinations thereof, wherein the thermoset polymer is selected from the group consisting of an ultraviolet light curable polymer, electron beam curable polymer and a combination thereof.

2. The method of claim 1, further including printing a design on the substrate.

3. The method of claim 2, wherein the pigmented topcoat is applied in register with the design printed upon the substrate.

4. The method of claim 1, wherein the substrate has an embossed surface formed by an embossing process selected from the group consisting of mechanical embossing, chemical embossing, and chemical and mechanical embossing.

5. The method of claim 4, wherein the pigmented topcoat is in register with the embossed surface.

6. The method of claim 4, wherein the embossed texture has raised surfaces and indentations, and the method further includes applying the pigmented topcoat mainly on the raised surfaces of the substrate.

7. The method of claim 4, wherein the embossed surface has raised surfaces and indentations, and the method further includes applying the pigmented topcoat to reside mainly in the indentations.

8. The method of claim 1, wherein the pigmented topcoat comprises nacreous pigments.

9. A method for manufacturing a floor covering or floor covering component comprising:
    providing a substrate;
    applying a pigmented wear layer to the substrate;
    applying a topcoat over the pigmented wear layer to form a wear layer/topcoat composite wherein the topcoat and pigmented wear layer consist essentially of at least one thermoset polymer and an ingredient selected from the group consisting of at least one pigment, at least one photoinitator, at least one photosensitizer, at least one surfactant, at least one reactive monomer and combinations thereof, wherein the thermoset polymer is selected from the group consisting of an ultraviolet light curable polymer, electron beam curable polymer and a combination thereof; and
    curing the wear layer/topcoat composite by subjecting the wear layer/topcoat composite to radiation selected from the group consisting of ultraviolet light, electron beam radiation, and both ultraviolet light and electron beam radiation to form a wear layer/topcoat composite having a stain resistance of less than about 150 Delta E units.

10. The method of claim 9, further including printing a pattern on the substrate.

11. The method of claim 10, wherein the pigmented wear layer is applied in register with the pattern printed upon the substrate.

12. The method of claim 9, wherein the substrate has an embossed surface formed by an embossing process selected from the group consisting of mechanical embossing, chemical embossing, and chemical and mechanical embossing.

13. The method of claim 12, wherein the pigmented wear layer is in register with the embossed surface.

14. The method of claim 12, wherein the embossed surface has raised surfaces and indentations, and the method further includes applying the pigmented wear layer on the raised surfaces of the substrate.

15. The method of claim 12, wherein the embossed surface has raised surfaces and indentations, and the method further including applying the pigmented wear layer to reside in the indentations.

16. The method of claim 9, wherein the topcoat comprises nacreous pigment.

17. The method of claim 9, wherein the topcoat is pigmented.

18. The method of claim 9 wherein the pigmented wear layer is partially cured prior to applying a topcoat.

19. A method for manufacturing a floor covering component comprising:
    providing a rigid vinyl film;
    applying a pigmented wear layer to the substrate, the pigmented wear layer consisting essentially of at least one thermoset polymer and an ingredient selected from the group consisting of at least one pigment, at least one photoinitator, at least one photosensitizer, at least one surfactant, at least one reactive monomer and combinations thereof, wherein the thermoset polymer is selected from the group consisting of an ultraviolet light curable resin, electron beam curable resin and a combination thereof; and
    curing the wear layer by subjecting the wear layer to radiation selected from the group consisting of ultraviolet light, electron beam radiation, and both ultraviolet light and electron beam radiation to form a wear layer having a stain resistance of less than about 150 Delta E units.

20. The method of claim 19 further comprising applying a topcoat over the pigmented wear layer to form a wear layer/topcoat composite, the topcoat consisting essentially of at least one thermoset polymer and an ingredient selected from the group consisting of at least one pigment, at least one photoinitator, at least one photosensitizer, at least one surfactant, at least one reactive monomer and combinations thereof, wherein the thermoset polymer is selected from the group consisting of an ultraviolet light curable polymer, electron beam curable polymer, and a combination thereof; and
    curing the wear layer/topcoat composite by subjecting the wear layer/topcoat composite to radiation selected from the group consisting of ultraviolet light, electron beam radiation, and both ultraviolet light and electron beam radiation to form a wear layer/topcoat composite having a stain resistance of less than about 150 Delta E units.

21. The method of claim 20 wherein the pigmented wear layer is partially cured prior to applying a topcoat.

22. The method of claim 19, further including printing a pattern on the rigid vinyl film.

23. The method of claim 22, wherein the pigmented wear layer is applied to the side of the rigid vinyl film opposite the pattern printed.

24. The method of claim 22, wherein the topcoat is applied in register with the pattern printed upon the rigid vinyl film.

25. The method of claim 20, wherein the topcoat is pigmented.

* * * * *

UNITED STATES PATENT AND TRADEMARK OFFICE
CERTIFICATE OF CORRECTION

PATENT NO. : 6,908,585 B2  
DATED : June 21, 2005  
INVENTOR(S) : Wright, Jr. et al.

It is certified that error appears in the above-identified patent and that said Letters Patent is hereby corrected as shown below:

<u>Column 14,</u>
Line 1, insert -- mainly -- after "layer".
Line 6, insert -- mainly -- after "reside".

Signed and Sealed this

Eighteenth Day of April, 2006

JON W. DUDAS
*Director of the United States Patent and Trademark Office*